United States Patent
Fung et al.

(10) Patent No.: US 9,836,028 B2
(45) Date of Patent: *Dec. 5, 2017

(54) METHOD, SYSTEM AND PROCESSOR FOR INSTANTLY RECOGNIZING AND POSITIONING AN OBJECT

(71) Applicant: Chuck Fung, Sha Tin (HK)

(72) Inventors: Chuck Fung, Sha Tin (HK); Wai Tong Fung, Sha Tin (HK)

(73) Assignee: Chuck Fung, Sha Tin (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,062

(22) Filed: Jan. 5, 2017

(65) Prior Publication Data
US 2017/0116496 A1    Apr. 27, 2017

Related U.S. Application Data

(63) Continuation-in-part of application No. 14/766,309, filed as application No. PCT/CN2013/071583 on Feb. 8, 2013, now Pat. No. 9,576,213.

(51) Int. Cl.
*G04G 5/00*    (2013.01)
*G06K 9/20*    (2006.01)
(Continued)

(52) U.S. Cl.
CPC ............... *G04G 5/00* (2013.01); *G05B 15/02* (2013.01); *G06K 9/00208* (2013.01);
(Continued)

(58) Field of Classification Search
CPC .. G06T 7/73; G06T 7/593; G06T 7/70; G06K 9/2054; G06K 9/00208; G06K 9/46; G06K 9/00335; G04G 5/00
(Continued)

(56) References Cited

U.S. PATENT DOCUMENTS 8,243,136 B2    8/2012    Aota et al.
8,744,216 B2    6/2014    Arai et al.
(Continued)

FOREIGN PATENT DOCUMENTS

| | | |
|---|---|---|
| CN | 101441769 | 5/2009 |
| CN | 101487894 | 7/2009 |
| EP | 2264679 | 12/2010 |

OTHER PUBLICATIONS

International Search Report issued in the corresponding International PCT Application No. PCT/CN2013/071583, dated Nov. 14, 2013, 3 pages.

*Primary Examiner* — Daniel Mariam
(74) *Attorney, Agent, or Firm* — Hamre, Schumann, Mueller & Larson, P.C.

(57) ABSTRACT

The invention provides a method for instantly recognizing and positioning an object, comprising steps of: a) wirelessly searching a wireless identification of the object; b) capturing a plurality of images of the object for each image capture; c) determining a 2D center coordinate (x,y) of the object based on a center coordinate $(x_w, y_w)$ of the wireless identification of the object; d) transforming the captured images of the object to acquire a 3D pattern of the object, and comparing the 3D pattern of the object with 3D patterns pre-stored; and e) if the 3D pattern of the object matches with a pre-stored 3D pattern, calculating and obtaining a 3D center coordinate (x,y,z) of the object to recognize and position the object. The invention also provides a system and a processor enabling the method, and use of the system.

20 Claims, 6 Drawing Sheets

(51) Int. Cl.
  *G06T 7/73* (2017.01)
  *G06T 7/60* (2017.01)
  *G06T 7/593* (2017.01)
  *G06K 9/00* (2006.01)
  *G05B 15/02* (2006.01)

(52) U.S. Cl.
  CPC ....... *G06K 9/00771* (2013.01); *G06K 9/2054* (2013.01); *G06T 7/593* (2017.01); *G06T 7/60* (2013.01); *G06T 7/73* (2017.01); *G06T 2207/10016* (2013.01); *G06T 2207/10028* (2013.01); *G06T 2207/30212* (2013.01)

(58) Field of Classification Search
  USPC .............................. 382/103, 154; 348/47–50
  See application file for complete search history.

(56) References Cited

U.S. PATENT DOCUMENTS

| | | | | |
|---|---|---|---|---|
| 8,867,853 B2* | 10/2014 | Migdal | ................. | G07F 19/207 348/143 |
| 2005/0105401 A1* | 5/2005 | Akahane | ................ | G04R 20/00 368/187 |
| 2005/0259722 A1* | 11/2005 | Vanlonden | ............. | H04B 15/04 375/145 |
| 2008/0225137 A1 | 9/2008 | Kubo et al. | | |
| 2012/0269386 A1 | 10/2012 | Hankins et al. | | |

* cited by examiner

METHOD, SYSTEM AND PROCESSOR FOR INSTANTLY RECOGNIZING AND POSITIONING AN OBJECT

FIELD OF THE INVENTION

The present invention is generally related to method, system and processor for recognizing and positioning an object, and use of the system. More specifically, the present invention concerns a method, system and processor for instantly recognizing and positioning an object which may instantly position an object and need no complicated hardware and software installation, and use of the system.

BACKGROUND OF THE INVENTION

In the metropolitan, the parents in most of the family are necessary to work outside, leaving baby, pet, child, elder or etc. with housekeeper at home. They cannot instantly view and control objects, receive alerts and monitor the events happening at home.

Presently, a plurality of cameras and/or responders are required for positioning objects, which results in expensive cost of hardware. General users may need to consult an engineer to do the hardware installation and set up each object with the aid of complex software menu. Some smart home systems currently available in the market allow a user to input the floor plan that may easily locate objects, and thus reduce the confusion of searching same objects at different location. However, there is no indication and tracking way to confirm which object and where the object to be correctly positioned. Most of existing smart home systems use cameras for monitoring purpose only and but control electronic objects through cable or wireless technology separately from the cameras, the images of the objects captured by the cameras are not used to control the objects, thus these systems cannot simultaneously position and control an object in real scene. The following table shows some technologies used in the current systems:

| | Solutions | Positioning | Controlling |
|---|---|---|---|
| 1 | Wireless communication as 433 MHz, 900 MHz, 2.4 GHz or etc. | No | Yes |
| 2 | RFID system | No | No |
| 3 | Infra-Red (IR) | No | Yes |
| 4 | 3 sets of ultra-sonic responder | Yes (single object) | No |
| 5 | 3 sets of camera | Yes | No |

Due to above technical limitations, there is no solution which can provide instant positioning of an object in real scene with only one camera, and which can allow the user to control an electronic object in real scene after the positioning and to achieve recognizing, positioning and control simultaneously. So the smart home system and other existing solutions are not user friendly because they are quite complicated and the user is required to take a lot of time to do hardware installation via cable or wireless network and software setup for each object. With the existing systems, the user cannot determine exact location and instantaneous scene of the object, and tends to mix up the control of the object with instantaneous alert originating from the same object. Moreover, the existing systems need a plurality of cameras and/or responders for searching and positioning objects and thus require for expensive cost for hardware.

SUMMARY OF THE INVENTION

In order to solve the above problems, the present invention has been developed to instantly recognize and position an object with only one camera without complicated hardware and software installation, such that the user may recognize and position objects in real scene.

These and other advantages of the invention are satisfied by providing a method for instantly recognizing and positioning an object, comprising the steps of:

a) wirelessly searching a wireless identification of the object;

b) capturing a plurality of images of the object by rotating a predetermined angle for each image capture;

c) determining a 2D center coordinate (x, y) of the object based on a center coordinate $(x_w, y_w)$ of the wireless identification of the object by point to point communication;

d) transforming the captured images of the object according to the 2D center coordinate (x, y) of the object to acquire a 3D pattern of the object, and comparing the 3D pattern of the object with 3D patterns pre-stored; and e) if the 3D pattern of the object matches with a pre-stored 3D pattern, calculating a distance between a plane defined by the X and Y axes of the object and a position where device used for capturing the images of the object is located to determine a coordinate z for the object, thereby obtaining a 3D center coordinate (x, y, z) of the object to recognize and position the object.

According to the method for instantly recognizing and positioning an object, the user can acquire the object's position instantly without the need of seeking the professional advice for hardware and software installation. Also, the user can control the objects in real scene with the aid of automatic positioning and configuration of the camera. Optionally, the actual location of the object with an alert may be instantaneously displayed through capturing the images of the object, enabling the user to immediately take any necessary action.

In one preferred embodiment of the invention, step c) may further comprise steps of segmenting the captured images into a predetermined number of regions, and determining which region the wireless identification of the object is located; and enlarging the determined region around the wireless identification of the object, and determining the 2D center coordinate (x, y) of the object in the enlarged region.

Preferably, the method may further comprise steps of narrowing the number of the segmented regions for determining the 2D center coordinate (x, y) of the object if the object is in overlapping regions of different images or same images.

In one preferred embodiment of the invention, step d) further comprises the steps of comparing the identification of the object with identifications of 3D patterns pre-stored; and transforming the images until the identification of the object matches with one of the identifications of the pre-stored patterns.

Preferably, the method may further comprise the steps of determining the percentage of recognizing 3D pattern of the object according to the comparison between the 3D pattern of the object with the 3D patterns pre-stored; if the percentage of recognizing the object is greater than or equal to a predetermined percentage, the object is recognized; and if the percentage of recognizing the object is smaller than a predetermined percentage, the object is analyzed for its color, texture and edge to be recognized.

Preferably, IR technology is used for fully or partially visible electronic objects, RFID technology is used for non-electronic or hidden objects.

According to one embodiment, if neither a non-electronic object nor its RFID is recognized, the position of the non-electronic object affixed with RFID tag is represented by the boundary of the wireless searching.

Preferably, wherein the distance between the X-Y plane of the object and the device for capturing is calculated based on signal transmission speed (by IR transceiver or flash light transmitter) or power consumption required for the signal to reach the object (for RFID reading).

Preferably, the method may further comprise the step of visibly controlling electric objects in real time.

Preferably, the method may further comprise the step of using a zoom function to fine tune the recognizing.

In one preferred embodiment of the invention, the transformation is rotation transformation.

The second aspect of the invention is to provide a system for instantly recognizing and positioning an object, comprising a camera, a server and a processor, wherein:

the camera is configured to communicate with the processor and capture a plurality of images of the object by rotating a predetermined angle for each image capture;

the server is configured to pre-store 3D patterns;

the processor is configured to wirelessly search a wireless identification of the object; receive the captured images of the object from the camera; determine a 2D center coordinate (x, y) of the object based on a center coordinate ($x_w$, $y_w$) of the wireless identification of the object by point to point communication; transform the captured images of the object according to the 2D center coordinate (x, y) of the object to acquire a 3D pattern of the object, and compare the 3D pattern of the object with 3D patterns pre-stored in the server; and if the 3D pattern of the object matches with a pre-stored 3D pattern, calculate a distance between a plane defined by the X and Y axes of the object and a position where device used for capturing the images of the object is located to determine a coordinate z for the object, thereby obtaining a 3D center coordinate (x, y, z) of the object to recognize and position the object.

The third aspect of the invention is to provide a processor for instantly recognizing and positioning an object, comprising:

wirelessly searching device for wirelessly searching a wireless identification of the object;

receiving device for receiving a plurality of images of the object captured by rotating a predetermined angle for each image capture;

2D coordinate determining device for determining a 2D center coordinate (x, y) of the object based on a center coordinate ($x_w$, $y_w$) of the wireless identification of the object by point to point communication;

3D pattern processing device for transforming the captured images of the object according to the 2D center coordinate (x, y) of the object to acquire a 3D pattern of the object, and compare the 3D pattern of the object with 3D patterns pre-stored; and 3D coordinate determining device for determining a 3D center coordinate (x, y, z) of the object to recognize and position the object by calculating a distance between a plane defined by the X and Y axes of the object and a position where device used for capturing the images of the object is located, if the 3D pattern of the object matches with a pre-stored 3D pattern.

The invention further provides a system for instantly recognizing and positioning an object, comprising the above processor and a camera.

The four aspect of the invention relates to the use of the system according to the invention for detecting operating state of an object and switching the object from open or on state to closed or off state if the object is detected to be in open or on state. As an alternative, the system generates an alert to manually switch the object from open or on state to closed or off state if the object is detected to be in open or on state.

The fifth aspect of the invention relates to the use of the system according to the invention for detecting the presence of a moving object.

The sixth aspect of the invention relates to the use of the system according to the invention for detecting the presence of time offset from a correct time of a timepiece and activating a processor of the timepiece for time correction of the timepiece in response to the presence of the time offset.

Unlike the systems for positioning and controlling an object known in the prior art, the invention allows for instantly recognizing, positioning and controlling an electronic object via IR technology and a non-electronic object via RFID technology in real scene using a single one camera only, requiring no complicated hardware installation and software setup. The invention also allows the user to visually monitor and control the instantaneous events in the scene through a display unit, for example, a smart phone with an application software installed therein, in wireless connection with the system. Thus, the method and system of the invention find a wide range of applications, including but not limited to home security and automation systems, systems for assisting a person with visual impairment or blindness to find an object.

The objects, characteristics, advantages and technical effects of the invention will be further elaborated in the following description of the concepts and structures of the invention with reference to the accompanying drawings.

DETAILED DESCRIPTION OF THE INVENTION

While this invention is illustrated and described in preferred embodiments, the invention may be produced in many different configurations, sizes, forms and materials.

Figure 1:
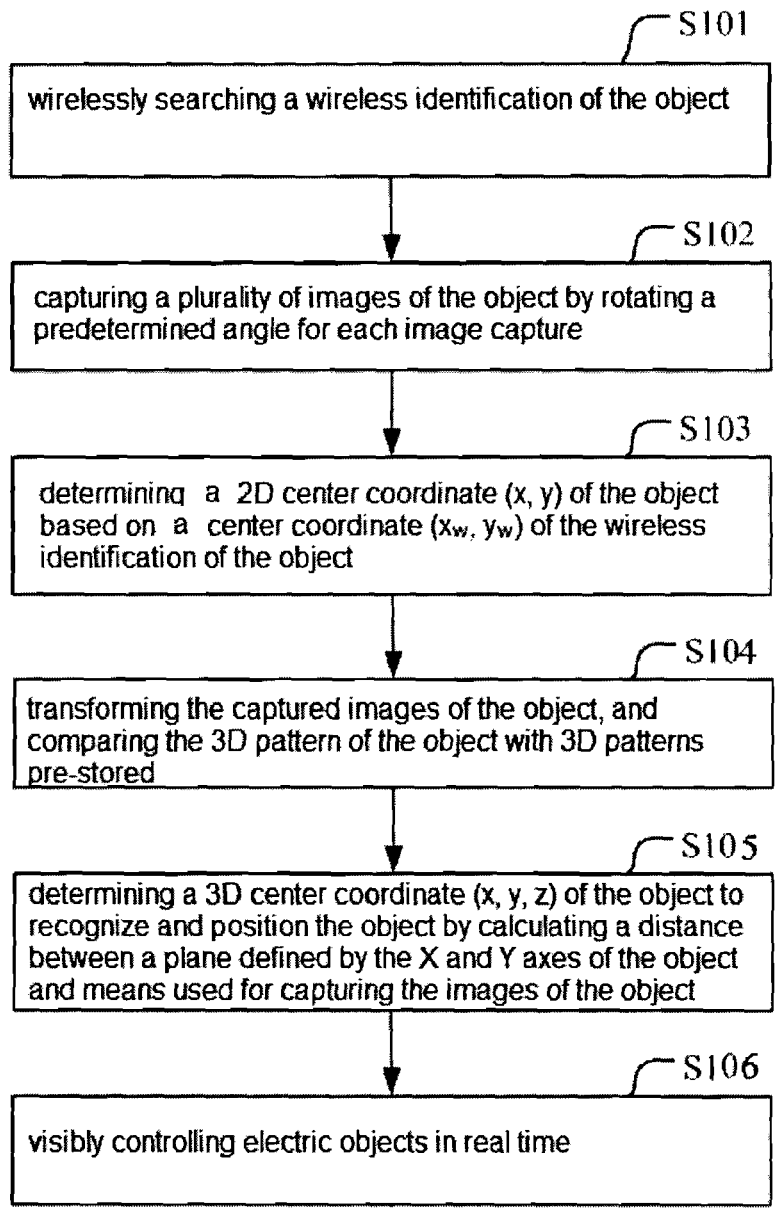
FIG. 1 shows a flow diagram of a method for instantly recognizing, positioning and controlling an object according to an embodiment of the invention.

Referring to FIG. 1, there is illustrated a method for instantly recognizing, positioning and controlling an object. As illustrated, the steps comprise wirelessly searching a wireless identification of the object in step s101; capturing a plurality of images of the object by rotating a predetermined angle for each image capture in step s102; determining a 2D center coordinate (x, y) of the object based on a center coordinate ($x_w$, $y_w$) of the wireless identification of the object by point to point communication in step s103; transforming the captured images of the object according to the 2D center coordinate (x, y) of the object to acquire a 3D pattern of the object, and comparing the 3D pattern of the object with 3D patterns pre-stored in step s104; and if the 3D pattern of the object matches with a pre-stored 3D pattern, calculating a distance between a plane defined by the X and Y axes of the object and a position where device used for capturing the images of the object is located to determine a coordinate z for the object, thereby obtaining a 3D center coordinate (x, y, z) of the object to recognize and position the object in step s105.

In this embodiment, the 3D coordinate of the device for capturing is set to be (0, 0, 0) for the sake of clarity and convenience, then the z coordinate of 3D center coordinate (x, y, z) of the object may be determined based on the distance between the X-Y plane of the object and the position of the device for capturing, such that the 3D coordinate center coordinate (x, y, z) of the object is obtainable on the basis of the 2D center coordinate (x, y) obtained in step s103. The distance between the device for capturing may be calculated based on IR signal transmission speed for the electronic objects or power consumption required for the RFID signal to reach the object for the non-electronic objects. Alternatively, such a distance may be pre-determined and pre-stored in the system since the device for capturing and the object are mounted in their respective fixed positions.

The method allows instantly recognizing or identifying the object's position in real scene, which is followed by controlling the object by a remote terminal in real scene. As compared with the methods known in the prior art, the method of the invention use only one capturing device for capturing the images, such as a camera for positioning an object in combination with an IR or RFID device, unlike the prior art methods which require a plurality of cameras. There is no restriction to the mounting of the camera, as long as the object is positioned such that it is within vision of the camera. Instantaneous scenes of the object may be shown on the display unit for example a mobile smart phone, to enable the user real-time view and select the objects and also real-time and visually control the selected objects via wireless or cable networks.

FIGS. 2 to 5 illustrate an example of recognizing and positioning the object using a camera module comprising one camera unit only. In this example, the camera unit with 3D coordinate (0, 0, 0) is configured to rotate arbitrarily about at least one of X-axis and Y-axis by a predetermined angle, for example 15° (see FIG. 3). In this embodiment, the camera unit is rotating about the Y axis vertically by 15° to capture the images on the X-Y plane. It is possible that the camera unit rotates about the X axis to capture the images on the X-Y plane, which is within the ability of a person skilled in the art. The working principle of the camera will be discussed here in below.

In general, the objects are classified into electronic objects such as TV set, DVD player or air-conditioner and non-electronic objects such as furniture, animal or human being. In the case of the electronic objects, the method of the invention is implemented based on the IR data transmission or flash light data transmission, and in the case of the non-electronic objects, the method of the invention is implemented based on the RFID data transmission. For the IR or flash light data transmission, an IR transceiver or a flash light transmitter is provided on the camera module, and an IR transceiver or a flash light receiver is provided on the electronic object. For the RFID data transmission, a RFID reader is installed on the camera module, and a RFID tag is affixed onto the non-electronic object. After the object is positioned and recognized by the camera module, the recognized object will be visually displayed in real scene.

Figure 4:
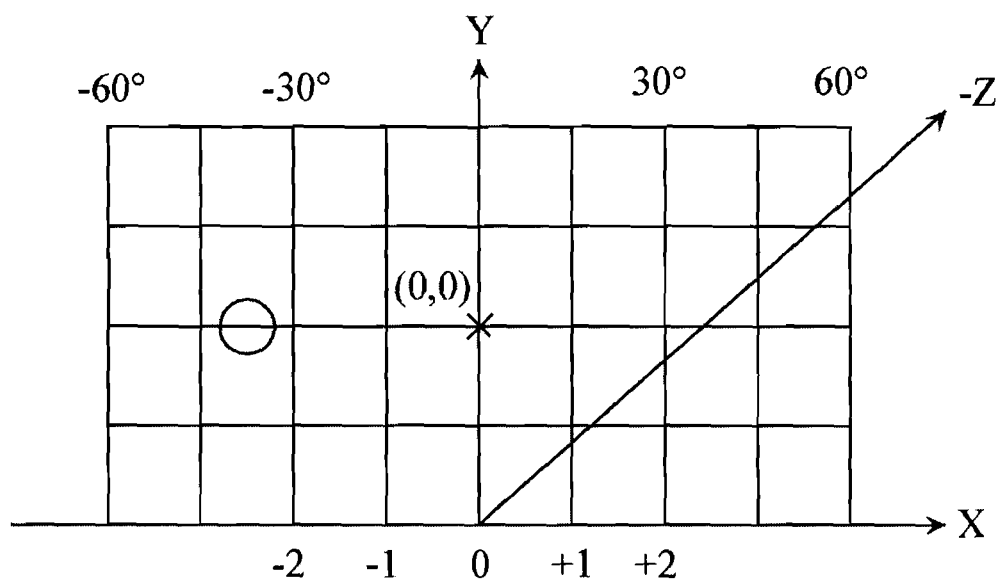
FIG. 4 shows an illustrative schematic diagram showing how to identify the object through the plurality of segmented regions.
Figure 5:
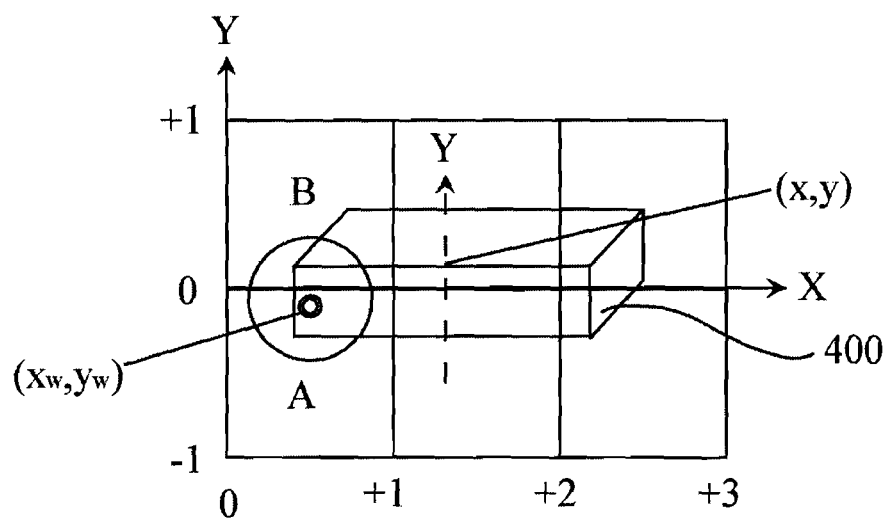
FIG. 5 shows an illustrative schematic diagram showing how to identify the object through the plurality of segmented regions in a perspective view.

In order to accelerate the positioning, the step s103 may further comprise a the step of segmenting the captured images into a predetermined number of regions, and determining which region the wireless identification of the object 20 is located. For precise positioning of the object 20, the step s103 may further comprise a step of enlarging the determined region around the center coordinate ($x_w$, $y_w$) of the wireless identification of the object 20, and determining the 2D center coordinate (x, y) of the object 20 in the enlarged region according to the center coordinate ($x_w$, $y_w$), as shown in FIGS. 4 and 5. In these figures, the circle represents where the identification of the object 20 to be searched is located in the segmented regions. The 2D center coordinate (x, y) of the object 20 would be determined in the enlarged regions around the center coordinate ($x_w$, $y_w$) of the identification of the object 20. It is possible to search the 2D center coordinate (x, y) of the object 20 using various methods, such as Fast nearest-neighbor algorithm, and using a pre-stored default distance between the center coordinate ($x_w$, $y_w$) of the identification and the 2D center coordinate (x, y) of the object 20, or determine the 2D center coordinate (x, y) of the object 20 according to the pre-stored pattern of the object 20.

Figure 2:
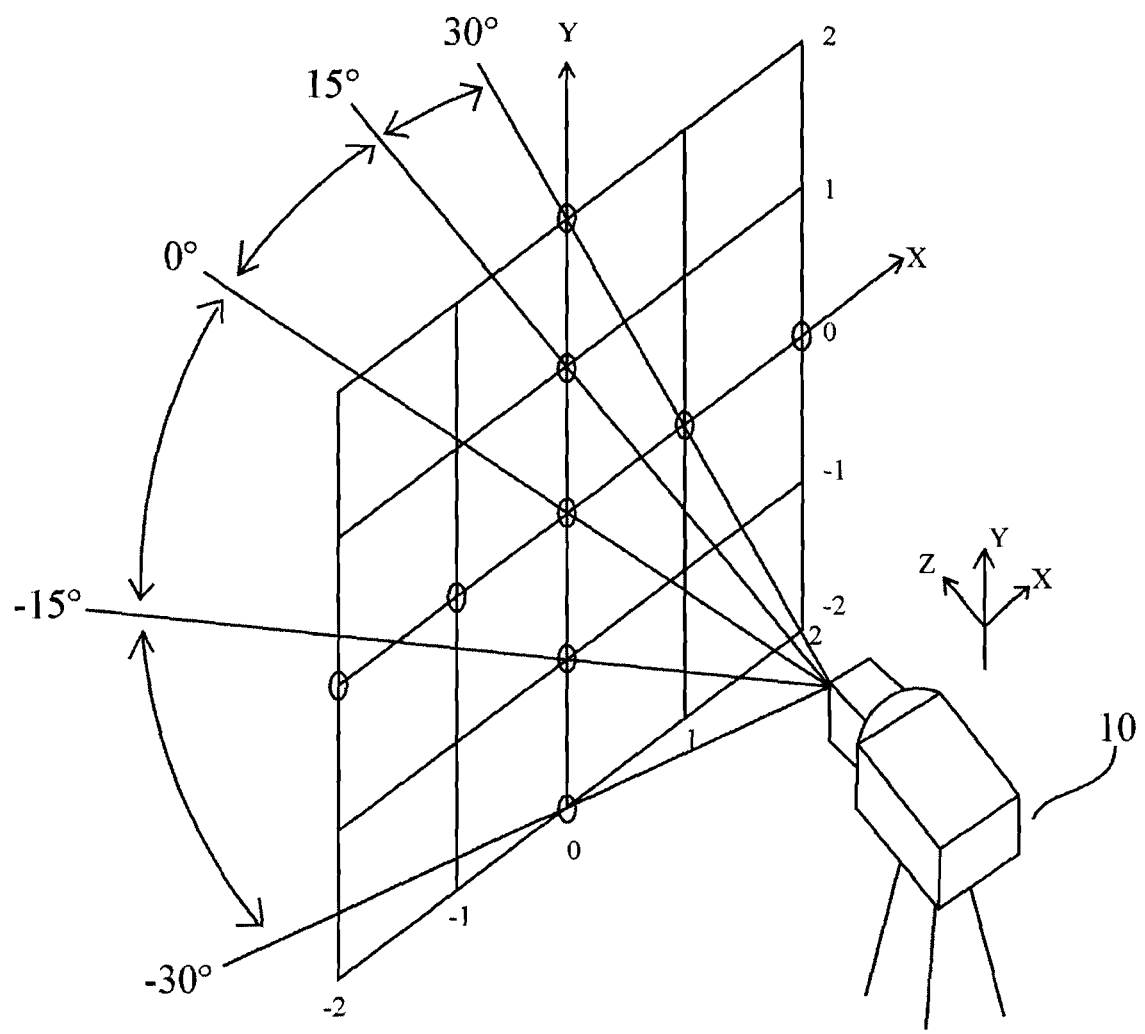
FIG. 2 shows an illustrative schematic diagram of a camera rotating to capture the images of the object in different segmented regions.

As clearly shown in FIGS. 2, 4 and 5, each image is segmented into a predetermined number of regions, the predetermined number may be chosen arbitrarily according to actual needs, for example 16 or 32. The 2D center coordinate (x, y) of the object 20 may be searched by using various methods, for example, using a search algorithm known in the art, such as Fast nearest-neighbor algorithm for matching individual features to a database of features, the algorithm disclosed in Computer Graphics; Crow, 1984.

To rapidly position and recognize the object 20, the number of the segmented regions for determining the 2D center coordinate (x, y) of the object 20 is narrowed if the object 20 is in overlapping regions of different images or same images. For example, as shown in FIG. 5, the identification of the object 20 with the center coordinate ($x_w$, $y_w$) is within the circle, and the object 20 is a rectangular box. FIG. 5 shows that the identification is found in regions A and B, if the object 20 is in overlapping regions of different images or same image in the right section of the regions A and B, then determination of the 2D center coordinate (x, y) of the object 20 may be limited to the regions A and B only.

In step s104, the identification of the object 20 is compared with identifications of 3D patterns pre-stored in the system; and the images are transformed until the identification of the object 20 matches with one of the identifications of the pre-stored patterns.

Hough Transform for detecting straight lines, circles, ellipses is an example of the transformation used in step s104 to compensate the rotation angle of object 20 according to the motion of the camera unit 10, preferably rotating transformation is used and implemented according to, for example, *The Mathematics of Graphical Transformations: Vector Geometric and Coordinate-Based Approaches* (refer to DesignLab Technical Report DL-1997-03), January 1997, in which the coordinate of the object 20 may be computed by multiplying a factor presented by using the following formula when the image rotates about X-axis, Y-axis and Z-axis respectively by an angle of θ:

$$R_x = \begin{pmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{pmatrix},$$

$$R_y = \begin{pmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{pmatrix}, R_z = \begin{pmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{pmatrix}.$$

Figure 3:
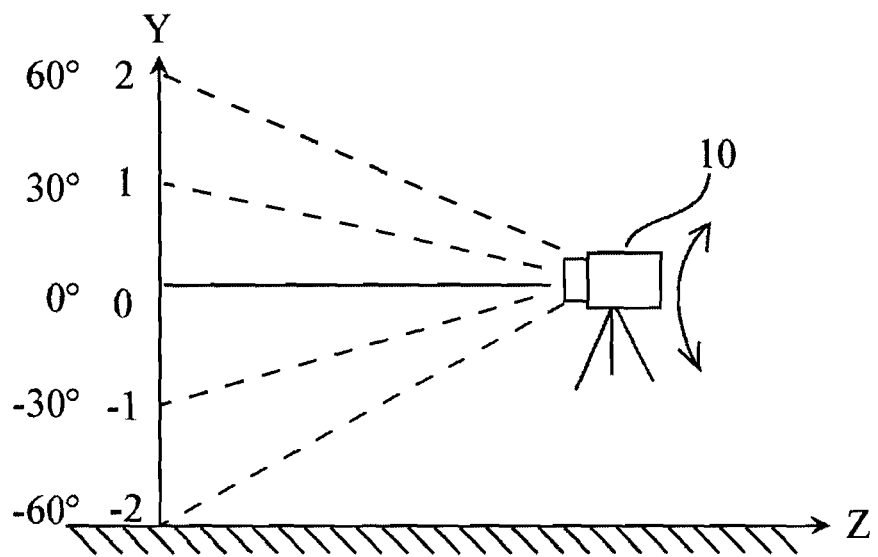
FIG. 3 shows an illustrative schematic diagram of the camera rotating about a Y axis to capture the images of the objection on a surface defined by X and Y axes.

Assuming that the camera unit 10 and the object 20 are on a same surface defined by X and Y axes, as shown in FIG. 3, the operations for determining the center coordinate (x, y) of the object 20 and the distance between the object 20 and the camera unit 10 are as follows:

1) Applying rotation transformation to compensate the rotation angle of images of the object 20 according to the rotation of the camera unit 10 about one of X and Y axes with the 2D center coordinate of the camera unit 10 being (0, 0), as shown in FIG. 4, wherein -Z axis refers to the negative direction of Z axis. For example, the images of the object 20 is rotated clockwise by +7.5° about Y axis; or rotated clockwise by −7.5° about X axis and +22.5° about Y axis respectively.

2) Searching the pre-stored pattern of front view of the object 20 within enlarged boundary, as shown in FIG. 5, by pattern recognition (for example: integral image), wherein the front view of the object 20 refers to that from the view of the camera unit 10.

3) Recognizing a printed circle label (which represents the identification, see the circle in FIGS. 4 and 5) around an IR transceiver or a flash light receiver (for electric objects) or RFID tag (for non-electric objects) on the front view of the object 20, and rotating it by transformation until it is found 100% exactly same as the circle label located at a pre-stored front view of the object 20. In this situation, the center coordinate $(x_w, y_w)$ of the IR transceiver or the flash light receiver or the RFID tag and shifted angles of X and Y axes can be positioned.

4) Shifting the center coordinate $(x_w, y_w)$ of IR transceiver or flash light receiver or RFID tag to find the center coordinate (x, y) of the object 20, for example, the distance between the center coordinate $(x_w, y_w)$ of IR transceiver/flash light receiver/RFID tag and the center coordinate (x, y) of the object 20 can be pre-stored and used for determining the center coordinate (x, y) of the object 20.

5) Determining the distance between the electric object and the camera unit 10 by the transmission speed and time during two-way IR transceiver communication or flash light transmitter and receiver communication with the camera unit 10; or determining the distance between non-electric object and the camera unit 10 by the power transmission corresponding to the distance between the RFID tag and camera unit 10. This distance is the z coordinate of the 3D coordinate of the object.

6) Shifting the center coordinate (x, y) of front view of the object 20 to the 3D center coordinate (x, y, z) of the object 20, so as to position the object.

Preferably, the method further comprise the steps of determining the percentage of recognizing 3D pattern of the object 20 according to the comparison between the 3D pattern of the object 20 with the 3D patterns pre-stored; if the percentage of recognizing the object 20 is greater than or equal to a predetermined percentage, the object 20 is recognized; if the percentage of recognizing the object 20 is smaller than a predetermined percentage, the object 20 is further analyzed for its color, texture and edge for the identification or recognition purpose.

The IR data transmission or flash light data transmission is used for fully or partially identifying visible electronic objects, and the RFID data transmission is used for non-electronic or hidden objects according to the invention. It is well known in the art that the data communication protocols of flash light and infrared are the same, they differs in light frequency only from each other.

The whole 3D pattern of object 20 would be confirmed by transformation if the percentage of recognizing the object 20 is greater than 90% according to the front view of the object 20.

The positioning and recognition of approximating, hidden or overlapped objects will be described as following:

1) Overlapped objects: if the percentage of recognizing the object 20 is smaller than 90%, it means that the object 20 is overlapped. In this case, identification methods known for an object including color, texture, edge, etc. can be applied to distinguish the partial view of object 20.

2) Approximating objects: if two or more same objects are located within one region, the printed circle label with IR/RFID technology cannot distinguish the positioning of them even their identifications are different. In this case, 3D transformation would be applied to distinguish the objects according to the 2D center coordinate (x, y) of object 20.

3) Partly or completely hidden objects: the hidden object will be positioned through the RFID searching method only according to the present invention. If the printed circle label cannot be found on the object 20 but the 3D pattern of the object 20 is partially recognized by transformation within the region according to RFID searching boundary, the 2D center coordinate (x, y) of object 20 can be determined. If both the object 20 and its printed circle label cannot be recognized, the position of object 20 would be represented by the region according to RFID searching boundary.

If neither a non-electronic object nor its RFID is recognized, the position of the non-electronic object affixed with RFID tag is represented by the boundary of the wireless searching.

Preferably, the distance between the X-Y plane of the object 20 and the device for capturing is calculated based on either the IR signal transmission speed or the power consumption required for the RFID signal to reach the object. More specifically, for identifying the electronic objects based on IR technology, the distance is calculated according to the transmission speed of the IR signal; for identifying non-electronic objects based on RFID technology, the distance is calculated according to the power required to send the RFID signal to arrive at the object. The method further comprises the step of visibly controlling electric objects in real time in step 106.

Preferably, the method may further comprise the step of activate the device for capturing to use a zoom function to fine tune the recognizing. The transformation is used in the invention for compensating for the rotation angle of the object 20 according to the motion of camera unit 10, such as rotation transformation that can increase the percentage of recognition accuracy.

The operations for recognizing, positioning and controlling an object by one camera according to the invention is as follows:

1) Activating a camera unit 10 and an IR transceiver or a flash light transmitter or RFID reader to search the object 20, as shown in FIG. 2;
2) Finding the object 20 via the IR transceiver or the flash light transmitter or the RFID reader;
3) Rotating 30° (depending on the viewing angle of camera unit 10) per step of both x and Y axes per image capturing, as shown in FIG. 3;
4) Segmenting 4×4=16 regions (depending on computation power) per image, as shown in FIG. 4;

With the above information obtained from the images, the object 20 can be positioned using an image recognition method as follows:

5) Confirming in which region(s) the object 20 is located;
6) Enlarging the recognition boundary around the object 20 on the regions as shown in FIG. 5, wherein the geometry of object 20 are pre-loaded in a MCU;
7) Recognizing and positioning the identified object 20 within the enlarged boundary, comprising:
   (1) Transforming the front view of the object 20 using rotating transformation according to the camera unit 10 rotating by different viewing angles;
   (2) Fast searching the 2D center coordinate (x, y) of rotated and scaled image within the enlarged boundary by Integral Image;
   (3) According to the 2D center coordinate (x, y) of the object 20, transforming the 3D geometry by rotation transformation of arbitrary axis;
   (4) Determining the percentage of recognizing which can identify object 20 when it is overlapped with or hidden behind a different object;
   (5) Identifying the overlapped (by IR transceiver or flash light transmitter or RFID reader) or hidden (by RFID reader) object 20 at (2) and (3) through comparison of the object 20 with the pre-stored data in terms of color, texture, edge, corner or etc.;
   (6) Driving the camera unit 10 to use a zoom function to fine tune the recognition;
8) Calculating the distance from the camera unit 10 to the object 20 according to the delay of IR signal transmitting or power consumption of RFID reading to acquire the z coordinate of the 20, thereby determining the 3D center coordinate (x, y, z) based on the above 2D center coordinate (x, y) and the z coordinate of the object 20.

Then the object is positioned and recognized even it is hidden partially or completely. When the positioned and recognized position is displayed on a display unit for example a smart phone or a TV monitor, it allows the user to real-time select the object and control the selected object through the display unit in real scene via wireless or cable networks.

Figure 6:
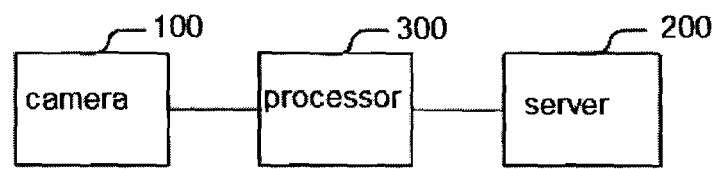
FIG. 6 shows a block diagram of a system for instantly recognizing, positioning and controlling the object according to an embodiment of the invention.

Referring to FIG. 6, there is illustrated a system for instantly recognizing, positioning and controlling an object, comprising a camera 100, a server 200 and a processor 300 which are connected from one another via a wireless network.

The camera 100, which is preset to have the 3D coordinate (0, 0, 0), is configured to communicate with the processor 300 and capture a plurality of images of the object by rotating a predetermined angle for each image capture.

The server 200 is configured to pre-store 3D patterns. According to the invention, the server 200 may be separated from the processor 300 or incorporated into the processor 300. It would be apparent that the data such as the 3D patterns may be stored in a separate memory. Preferably, the server 200 is pre-stored with the relevant information including position of the camera 100 with the coordinate (0, 0, 0), 3D pattern of a plurality of objects to be monitored including a door, a window, or a TV, or other household appliances. The information stored in the server includes shape, size, color, texture, edge of the objects, identification of the objects, the distance between the center of objects and their identifications, and the like. The 3D patterns of the object herein are characterized by the three-dimensional spatial models of the object with the feature information of its shape, size, color, surface texture, edge and the like, and may be pre-stored by a provider or user.

The processor 300 is configured to wirelessly search a wireless identification of the object; receive the captured images of the object from the camera 100; determine the 2D center coordinate (x, y) of the object based on the center coordinate ($x_w$, $y_w$) of the wireless identification of the object by point to point communication; transform the captured images of the object according to the 2D center coordinate (x, y) of the object to acquire a 3D pattern of the object, and compare the 3D pattern of the object with 3D patterns pre-stored in the server 200; and if the 3D pattern of the object matches with a pre-stored 3D pattern, calculate a distance between a plane defined by the X and Y axes of the object and a position where device used for capturing the images of the object is located to determine a coordinate z for the object, thereby obtaining a 3D center coordinate (x, y, z) of the object to recognize and position the object.

In operation, the processor 300 searches to identify the identification of the object via the IR signal or the RFID signal in order to determine the coordinate ($x_w$, $y_w$) of the identification. Then, the camera 100 is activated by the processor 300 to capture a plurality of images of the object by rotating a predetermined angle for each image capture and transmitting the images captured to the processor 300 where the 2D center coordinate (x, y) of the object is determined based on the center coordinate ($x_w$, $y_w$) of the wireless identification of the object. The processor 300 then transforms the captured images of the object according to the 2D center coordinate (x, y) of the object to acquire a 3D pattern of the object, and compares the 3D pattern of the object with the 3D patterns pre-stored in the server 200. If the 3D pattern of the object matches with a pre-stored 3D pattern, the distance between the X-Y plane of the object and the position of the camera 100 is calculated to determine a coordinate z for the object, thereby obtaining a 3D center coordinate (x, y, z) of the object. After the object is positioned and recognized, the object is displayed on a displayer and can be controlled by the user visually in real time.

In the case of an electronic object, it may receive incoming commands and may be controlled by the processor 300 in real scene. Preferably, the processor 300 is further configured to segment the captured images into a predetermined number of regions, and determine in which regions the wireless identification of the object is located; enlarge the determined regions around the wireless identification of the object, and determine the 2D center coordinate (x, y) of the object in the enlarged regions.

Preferably, the processor 300 is further configured to narrow the coverage for determining the 2D center coordinate (x, y) of the object if the object is in overlapping regions of different images or same image.

Preferably, the processor 300 is further configured to compare the identification of the object with identifications of 3D patterns pre-stored; transform the images until the identification of the object matches with one of the identifications of the pre-stored patterns.

Preferably, the processor 300 is further configured to determine the percentage of recognizing 3D pattern of the object according to the comparison between the 3D pattern of the object with the 3D patterns pre-stored; if the percentage of recognizing the object is greater than or equal to a predetermined percentage, the object is recognized; if the percentage of recognizing the object is smaller than a predetermined percentage, the object is analyzed for its color, texture and edge to be recognized.

As discussed above, the IR technology is used for fully or partially visible electronic objects, the RFID technology is used for non-electronic or hidden objects.

If neither a non-electronic object nor its RFID is recognized, the position of the non-electronic object affixed with RFID tag is represented by the boundary of the wirelessly searching.

Preferably, the distance between the X-Y plane of the object and the device for capturing is calculated based on signal transmission speed or power consumption required for the signal to reach the object.

Preferably, the processor 300 is further configured to visibly control electric objects in real time.

Preferably, the processor 300 is further configured to activate the camera 100 to use a zoom function to fine tune the recognition, the camera 100 is activated to use a zoom function to fine tune the recognition when driven by the processor 300.

The transformation is used in the invention for compensating for the rotation angle of the object according to the camera's motion, such as rotation transformation.

Figure 7A:
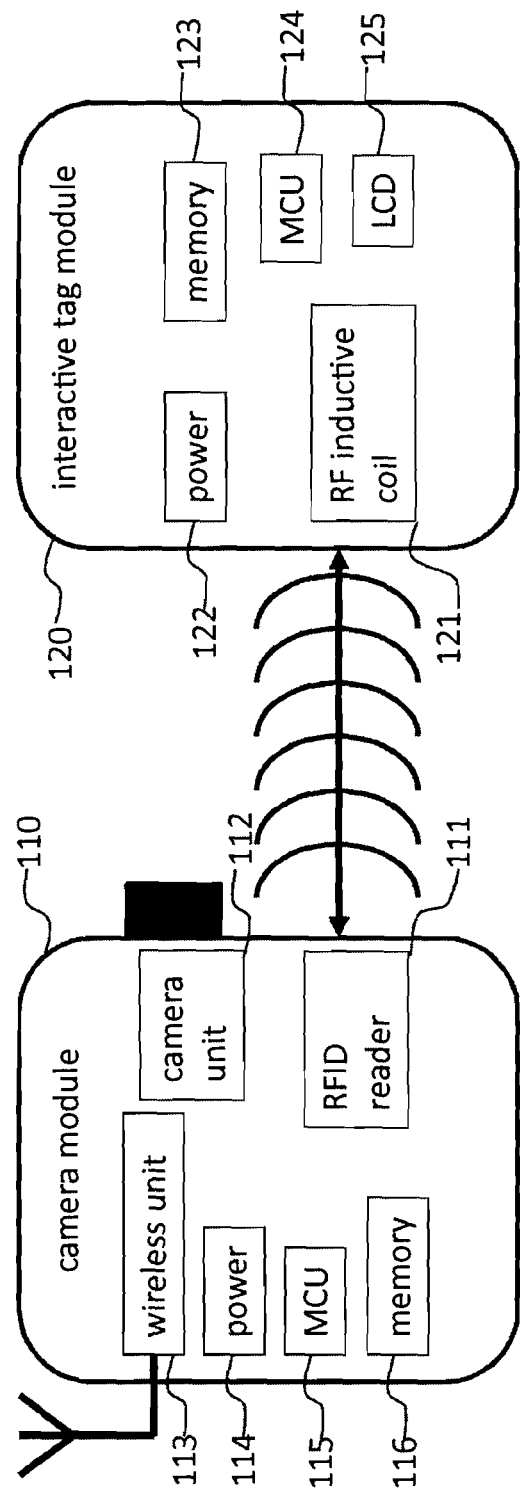
FIG. 7a shows an illustrative schematic diagram of the system according to the invention which is based on the RFID technology.
Figure 7B:
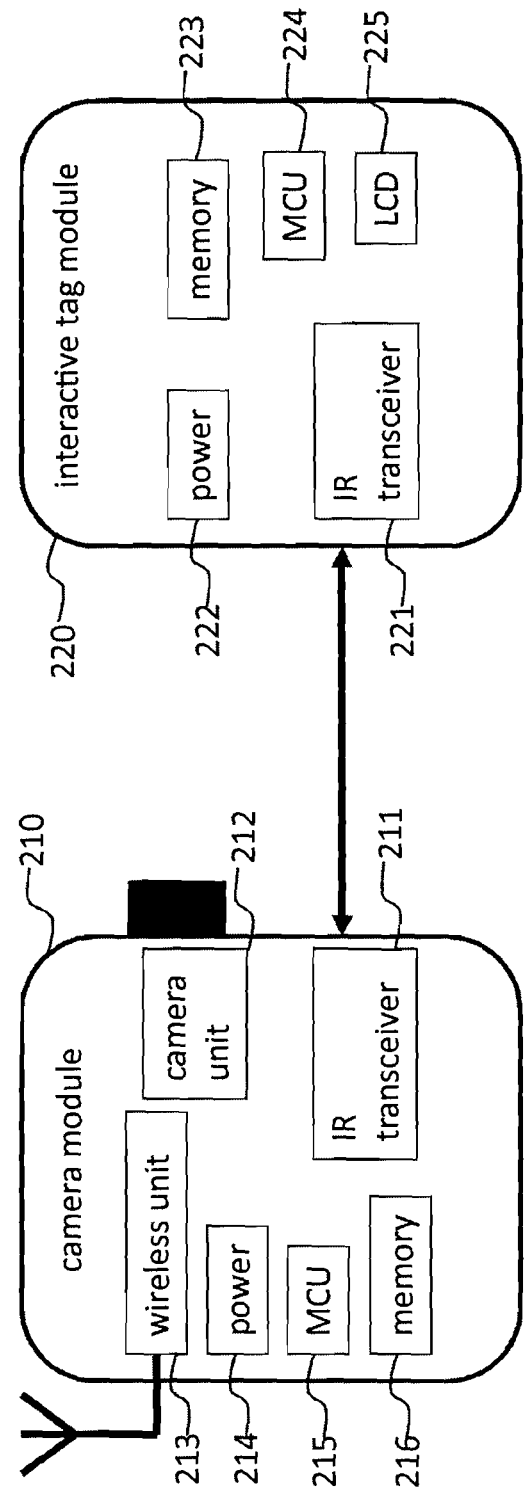
FIG. 7b shows an illustrative schematic diagram of the system according to the invention which is based on IR technology.

FIGS. 7a and 7b are two specific examples of the system of the invention. In FIG. 7a, the system is based on the RFID technology and used for non-electric objects, comprising a camera module 110 and an interactive tag module 120. In this example, the camera module 110 comprises an RFID reader 111 for identifying the object by reading RF signals from the interactive tag module 120, a camera unit 112 for capturing images of the object, a MCU 115 acting as the processor, a wireless unit 113 for receiving a command from the user and delivering the command to the MCU 115 to instantly control the objects as desired, a power 114 for powering the camera module, and a memory 116 for storing the data including the pre-stored 3D patterns of all the objects in a given circumstance. The interactive tag module 120 comprises an RF inductive coil 121 for sending RF signals to the RFID reader 111, a power 122 for powering the tag module, a memory 123, a MCU 124, an LCD 125. The interactive tag module 120 may be affixed on an outer surface of the object or built in the object.

FIG. 7b is the system according to the invention based on IR technology and used for electric objects, comprising a camera module 210 and an RF interactive tag module 220. In this example, the camera module 210 comprises an IR transceiver 211 capable of communicating with the interactive tag module 220 and identifying an object by receiving signals from the interactive tag module 220, a camera unit 212 for capturing images of objects, a MCU 215 acting as the processor, a wireless unit 213 for receiving a command from the user and delivering the command to the MCU 215 to instantly control the objects if desired, a power 214 for powering the camera module, and a memory 211 for storing the data including the pre-stored 3D patterns of all the objects in a given circumstance. The interactive tag module 220 comprises an IR transceiver 221 (which may be same as or different from the IR transceiver 211) for communicating with the IR transceiver 211, a power 222 for powering the tag module, a memory 223, a MCU 224, an LCD 225. The interactive tag module 220 may be affixed on a surface of the object or built in the object.

In general, the camera module 110 in FIG. 7a and the camera module 210 in FIG. 7b are integrated as on module that is capable of both processing the electronic and non-electronic objects.

According to the invention, there is further provided the use of the system according to the invention for detecting operating state of an object and switching the object from open or on state to closed or off state if the object is detected to be in open or on state. For this purpose, the processor of the invention is configured to detect whether the target object is in normal position or normal state by comparing the 3D pattern of the object in that position with the pre-stored 3D patterns of the object in normal position. If there is difference in the 3D pattern, the system of the invention would generate an alert to the user for manually switching the object from open or on state to closed or off state; or automatically switching the object off. For example, the system may detect whether a door or a window is properly closed when the user is leaving home; and detects whether the electronic appliance like TV set or DVD are on when the user is not at home. With the aid of the system, the user would be able to manage and control his/her home efficiently and smartly.

The system according to the invention may find another application in detecting the presence of a moving object. Namely, the system of the invention may be used to detect whether an object like people or pet animals are moving within the vision of the camera unit. In particular, the system is configurable to capture and compare the images of a certain object like TV set periodically, and if the images of the TV set are different at two moments, it suggests something is moving in front of the TV set and then the system would generate an alarm signal. This is particularly useful to detect whether someone intrudes into the home.

Another use of the system according to the invention is for time correction. The system may be configurable to detect the presence of time offset from a correct time in a timepiece and activating a processor of the timepiece for time correction of the timepiece in response to the presence of the time offset. In particular, the system of the invention would periodically capture the images of front view of the timepiece by the camera to recognize the displaying time of the timepiece and determine whether the displaying time of the timepiece is correct. If there is any time offset from the correct time, the system, in more particular the processor or the system, would send a time signal containing the information on how much the displaying time is quicker or slower than the correct time to the MCU or CPU processor of the timepiece, which is then activated to correct the displaying time to the correct time. Generally, the MCU or CPU processor of the timepiece is pre-configured to communicate with the system of the invention through IR signal transmission or coded flash light signal transmission and can re-set the time automatically. One example of the flash light is the visible light. According to the embodiment of the invention, the MCU or CPU processor of the timepiece is configured to have an IR receiver for the IR signal transmission or a photo sensor for the coded flash light signal transmission. The signal sent by the system of the invention is provided in a binary digital code according to a transmission protocol such as CRC code protocol. The coded signal contains the information on how much the time offset is and whether the displaying time is quicker or slower than the correct time. How to construct a coded signal would be within the ability of a person skilled in the art, and therefore will not be described herein.

It is especially useful for time correction of those timepieces when the radio-controlled clock is not available, since the system of the invention provides another source of correct time for the timepiece.

One of the advantages of the system according to the invention is that no additional radio interference affects the medical equipment at hospital and clinic when it is used there because it is based on IR or RFID technology of short range line-of-sight communication.

The above device and methods may be implemented by computer programs, software and/or hardware which may be incorporated into CPU, microprocessor, etc. in any combination.

Thus, the present invention provides methods, systems and processors which allow for instantly recognizing, positioning and controlling an object using one camera only, requiring no complicated hardware installation and software setup, such that the user may easily control the active object in real scene after automatically positioning the object.

Having sufficiently described the nature of the present invention according to some preferred embodiments, the invention, however, should not be limited to the structures and functions of the embodiments and drawings. It is stated that insofar as its basic principle is not altered, changed or modified it may be subjected to variations of detail. Numerous variations and modifications that are easily obtainable by means of the skilled person's common knowledge without departing from the scope of the invention should fall into the scope of this invention.

What is claimed is:

1. A method for time correction of a timepiece, comprising applying a system for instantly recognizing and positioning an object for detecting the presence of time offset from a correct time in the timepiece, and activating a processing device of the timepiece for time correction of the timepiece in response to the presence of the time offset,
wherein the system for instantly recognizing and positioning an object comprises a camera and a processor, wherein:
the camera is configured to communicate with the processor and capture a plurality of images of the object by rotating a predetermined angle for each image capture; and
the processor is configured to:
wirelessly search a wireless identification of the object;
receive the captured images of the object from the camera; and
recognize the time offset based on the captured images of the object to activate the time correction of the time piece.

2. The method according to claim 1, wherein the processor is configured to:
determine a 2D center coordinate (x,y) of the object based on a center coordinate $(x_w, y_w)$ of the wireless identification of the object by point to point communication;
transform the captured images of the object according to the 2D center coordinate (x,y) of the object to acquire a 3D pattern of the object, and compare the 3D pattern of the object with pre-stored 3D patterns; and
if the 3D pattern of the object matches with a pre-stored 3D pattern, calculate a distance between a plane defined by the X and Y axes of the object and a position where device used for capturing the images of the object is located to determine a coordinate z for the object, thereby obtaining a 3D center coordinate (x, y, z) of the object to recognize and position the object.

3. The method according to claim 1, wherein the processor is further configured to:
segment the captured images into a predetermined number of regions, and determining which regions the wireless identification of the object is located;
enlarge the determined regions around the wireless identification of the object, and determining the 2D center coordinate (x,y) of the object in the enlarged regions.

4. The method according to claim 3, wherein the processor is further configured to:
narrow the coverage for determining the 2D center coordinate (x,y) of the object if the object is in overlapping regions of different images or same images.

5. The method according to claim 1, wherein the processor is further configured to:
compare the identification of the object with identifications of 3D patterns pre-stored;
transform the images until the identification of the object matches with one of the identifications of the pre-stored patterns.

6. The method according to claim 5, wherein the processor is further configured to:
determine the percentage of recognizing 3D pattern of the object according to the comparison between the 3D pattern of the object with the 3D patterns pre-stored;
if the percentage of recognizing the object is greater than or equal to a predetermined percentage, the object is recognized;
if the percentage of recognizing the object is smaller than a predetermined percentage, the object is analyzed for its color, texture and edge to be recognized.

7. The method according to claim 1, wherein IR data transmission or flash light date transmission is used for fully or partially visible electronic objects, RFID data transmission is used for non-electronic or hidden objects.

8. The method according to claim 7, wherein if neither a non-electronic object nor its RFID is recognized, the position of the non-electronic object affixed with RFID tag, is represented by the boundary of the wirelessly searching.

9. The method according to claim 1, wherein the distance between the X-Y plane of the object and the device for capturing is calculated based on signal transmission speed or power consumption required for the signal to reach the object.

10. The method according to claim 1, wherein the processor is further configured to:
visibly control electric objects in real time.

11. The method according to claim 1, wherein the processor is further configured to:
drive the camera to use a zoom function to fine tune the recognizing.

12. The method according to claim 1, wherein the transformation is rotation transformation.

13. A method for detecting the presence of a moving object, comprising applying a system for instantly recognizing and positioning an object for detecting the presence of the moving object,
 wherein the system for instantly recognizing and positioning an object comprises a camera and a processor, wherein:
 the camera is configured to communicate with the processor and capture a plurality of images of the object by rotating a predetermined angle for each image capture; and
 the processor is configured to:
  wirelessly search a wireless identification of the object;
  receive the captured images of the object from the camera;
  determine a 2D center coordinate (x,y) of the object based on a center coordinate $(x_w, y_w)$ of the wireless identification of the object by point to point communication;
  transform the captured images of the object according to the 2D center coordinate (x,y) of the object to acquire a 3D pattern of the object, and compare the 3D pattern of the object with pre-stored 3D patterns; and
  if the 3D pattern of the object matches with a pre-stored 3D pattern, calculate a distance between a plane defined by the X and Y axes of the object and a position where device used for capturing the images of the object is located to determine a coordinate z for the object, thereby obtaining a 3D center coordinate (x,y,z) of the object to recognize and position the object.

14. A processor for instantly recognizing and positioning an object, comprising:
 wirelessly searching device for wirelessly searching a wireless identification of the object;
 receiving device for receiving a plurality of images of the object captured by rotating a camera in communication with the processor to a predetermined angle for each image capture;
 2D coordinate determining device for determining a 2D center coordinate (x,y) of the object based on a center coordinate $(x_w, y_w)$ of the wireless identification of the object by point to point communication;
 3D pattern processing device for transforming the captured images of the object according to the 2D center coordinate (x,y) of the object to acquire a 3D pattern of the object, and compare the 3D pattern of the object with 3D patterns pre-stored; and
 3D coordinate determining device for determining a 3D center coordinate (x, y, z) of the object to recognize and position the object by calculating a distance between a plane defined by the X and Y axes of the object and a position where device used for capturing the images of the object is located, if the 3D pattern of the object matches with a pre-stored 3D pattern.

15. The processor according to claim 14, wherein the 2D coordinate determining device further comprising:
 segmenting device for segmenting the captured images into a predetermined number of regions, and determining which regions the wireless identification of the object is located;
 enlarging device for enlarging the determined regions around the wireless identification of the object, and determining the 2D center coordinate (x,y) of the object in the enlarged regions.

16. The processor according to claim 15, wherein the 2D coordinate determining device further comprising:
 narrowing device for narrowing the coverage for determining the 2D center coordinate (x,y) of the object if the object is in overlapping regions of different images or same images.

17. The processor according to claim 14, wherein the 3D pattern processing device further comprising:
 comparing device for comparing the identification of the object with identifications of 3D patterns pre-stored;
 transforming device for transforming the images until the identification of the object matches with one of the identifications of the pre-stored patterns.

18. The processor according to claim 17, further comprising:
 recognizing percentage determining device for determining the percentage of recognizing 3D pattern of the object according to the comparison between the 3D pattern of the object with the 3D patterns pre-stored;
 if the percentage of recognizing the object is greater than or equal to a predetermined percentage, the object is recognized;
 if the percentage of recognizing the object is smaller than a predetermined percentage, the object is analyzed for its color, texture and edge to be recognized.

19. The processor according to claim 14, wherein IR data transmission or flash light date transmission is used for fully or partially visible electronic objects, RFID data transmission is used for non-electronic or hidden objects.

20. The processor according to claim 19, wherein if neither a non-electronic object nor its RFID is recognized, the position of the non-electronic object affixed with RFID tag is represented by the boundary of the wirelessly searching.

* * * * *